(12) United States Patent
Henry et al.

(10) Patent No.: US 11,736,721 B2
(45) Date of Patent: Aug. 22, 2023

(54) METHODS AND DEVICES FOR CODING AND DECODING A DATA STREAM REPRESENTATIVE OF AT LEAST ONE IMAGE

(71) Applicant: ORANGE, Issy-les-Moulineaux (FR)

(72) Inventors: Felix Henry, Chatillon (FR); Mohsen Abdoli, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/560,851

(22) Filed: Dec. 23, 2021

(65) Prior Publication Data

US 2022/0116658 A1    Apr. 14, 2022

Related U.S. Application Data

(63) Continuation of application No. 16/617,275, filed as application No. PCT/FR2018/051210 on May 18, 2018, now Pat. No. 11,245,924.

(30) Foreign Application Priority Data

May 29, 2017  (FR) ...................................... 1754688

(51) Int. Cl.
*H04N 19/593*  (2014.01)
*H04N 19/105*  (2014.01)
(Continued)

(52) U.S. Cl.
CPC ......... *H04N 19/593* (2014.11); *H04N 19/105* (2014.11); *H04N 19/11* (2014.11); *H04N 19/176* (2014.11); *H04N 19/147* (2014.11)

(58) Field of Classification Search
CPC .... H04N 19/593; H04N 19/105; H04N 19/11; H04N 19/176
See application file for complete search history.

(56) References Cited

U.S. PATENT DOCUMENTS

| 10,397,570 B2 | 8/2019 | Henry |
| 10,469,872 B2 | 11/2019 | Philippe et al. |

(Continued)

FOREIGN PATENT DOCUMENTS

| CN | 105723709 A | 6/2016 |
| CN | 106576166 A | 4/2017 |

(Continued)

OTHER PUBLICATIONS

International Search Report dated Aug. 7, 2018 or corresponding International Application No. PCT/FR2018/051210 filed May 18, 2018.

(Continued)

*Primary Examiner* — Fabio S Lima
(74) *Attorney, Agent, or Firm* — David D. Brush; Westman, Champlin & Koehler, P.A.

(57) ABSTRACT

A method and device for encoding and a method and device for decoding a signal including encoded data representing an image sub-divided into blocks, and information representing a correction block and a residual block. For a current block of the image, a first pixel is encoded from a prediction value obtained for the first pixel from at least one pixel of a previously rebuilt block. The prediction is corrected using at least one value of a pixel of the correction block. At least one current pixel of the current block is encoded from a prediction value obtained for the current pixel from at least one previously corrected pixel of the current block. The prediction is corrected by using at least one value of a pixel of the correction block, delivering a prediction block for the current block. The residual block is computed from the current block and the predictive block.

21 Claims, 4 Drawing Sheets

Figure 1:
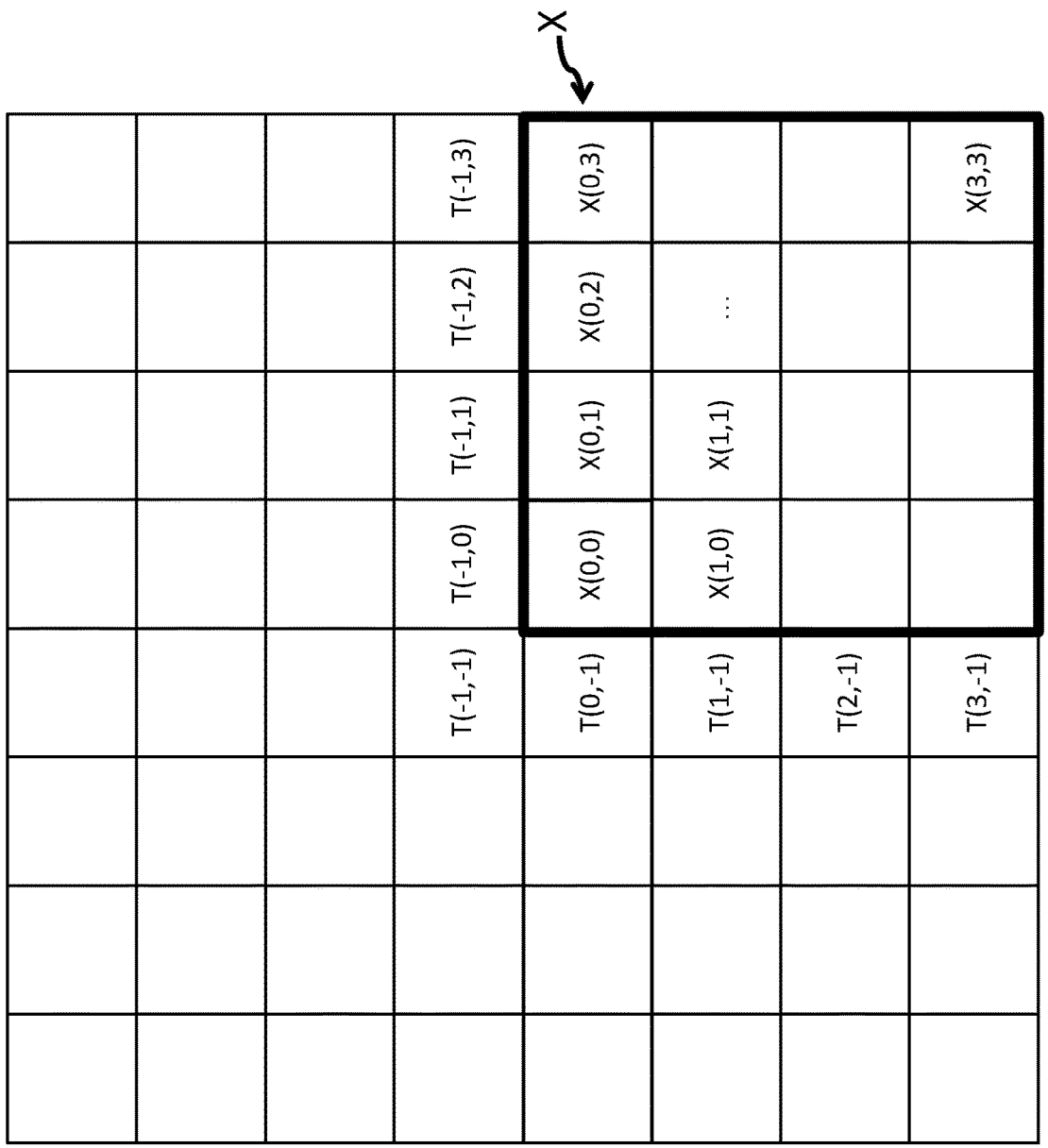

(51) Int. Cl.
*H04N 19/11* (2014.01)
*H04N 19/176* (2014.01)
*H04N 19/147* (2014.01)

(56) References Cited

U.S. PATENT DOCUMENTS

| | | | |
|---|---|---|---|
| 10,645,416 B2 | 5/2020 | Min et al. | |
| 2006/0209953 A1* | 9/2006 | Jung | H04N 19/105 375/E7.176 |
| 2008/0201346 A1 | 8/2008 | Monro | |
| 2008/0201352 A1 | 8/2008 | Monro | |
| 2011/0170601 A1 | 7/2011 | Kim et al. | |
| 2013/0016777 A1 | 1/2013 | Gao et al. | |
| 2013/0051474 A1 | 2/2013 | Kim et al. | |
| 2013/0128981 A1* | 5/2013 | Kazui | H04N 19/156 375/240.12 |
| 2013/0136372 A1 | 5/2013 | Thoreau et al. | |
| 2013/0322520 A1 | 12/2013 | Terada et al. | |
| 2014/0334551 A1* | 11/2014 | Kim | H04N 19/42 375/240.16 |
| 2015/0264372 A1 | 9/2015 | Kolesnikov et al. | |
| 2016/0112720 A1 | 4/2016 | Gao et al. | |
| 2016/0150243 A1* | 5/2016 | Shima | H04N 19/70 375/240.12 |
| 2016/0277736 A1 | 9/2016 | Henry | |
| 2017/0230688 A1 | 8/2017 | Philippe et al. | |
| 2018/0241998 A1 | 8/2018 | Chen et al. | |
| 2019/0104304 A1* | 4/2019 | Lee | H04N 19/182 |
| 2020/0084471 A1* | 3/2020 | Henry | H04N 19/176 |

FOREIGN PATENT DOCUMENTS

| | | | |
|---|---|---|---|
| WO | 2013009896 A1 | 1/2013 | |
| WO | 2013067435 A1 | 5/2013 | |

OTHER PUBLICATIONS

Written Opinion of the International Searching Authority dated Aug. 7, 2018 or corresponding International Application No. PCT/FR2018/051210, filed May 18, 2018.

English translation of the Written Opinion of the International Searching Authority dated Aug. 17, 2018 or corresponding International Application No. PCT/FR2018/051210, filed May 18, 2018.

Linde Y. et al., "An Algorithm for Vector Quantizer Design", IEEE Transactions on Communications, IEEE Service Center, Piscataway, NJ, USA, vol. COM-28. No. 1, Jan. 1, 1980 (Jan. 1, 1980), pp. 84-95, XP000563284.

D. Marpe, et al., "Context-based adaptive binary arithmetic coding in the H.264/AVC video compression standard" IEEE Transactions on Circuits and Systems for Video Technology, (vol. 13, Issue: 7 ), pp. 620-636, dated Jul. 2003.

Matthias Wien, "High Efficiency Video Coding, Coding Tools and Specification", Signals and Communication Technology, DOI 10.1007/978-3-662-44276-0, dated 2015.

G.-J. Sullivan, et al., "Overview of the High Efficiency Video Coding (HEVC) Standard", IEEE Transactions on Circuits and Systems for Video Technology, dated Dec. 2012.

Olli Virmajoki, "Pairwise Nearest Neighbor Method Revisited" University of Joensuu, Computer Science, Academic Dissertation, ISBN 952-458-632-0, dated Dec. 11, 2004 (Equivalent of A. Gersho et al., "Vector Quantization and Signal Compression", The Springer International Series in Engineering and Computer Science Series vol. 159 Springer US).

Office Action dated Feb. 3, 2021 for corresponding U.S. Appl. No. 16/617,275, filed Nov. 26, 2019.

Final Office Action dated May 14, 2021 for corresponding U.S. Appl. No. 16/617,275, filed Nov. 26, 2019.

Advisory Action dated Aug. 20, 2021 for corresponding U.S. Appl. No. 16/617,275, filed Nov. 26, 2019.

Notice of Allowance dated Sep. 29, 2021 for corresponding U.S. Appl. No. 16/617,275, filed Nov. 26, 2019.

Chinese Office Action, including Search Report, dated Dec. 20, 2022, for parallel Chinese Application No. 201880035681.1, filed on May 18, 2018.

\* cited by examiner

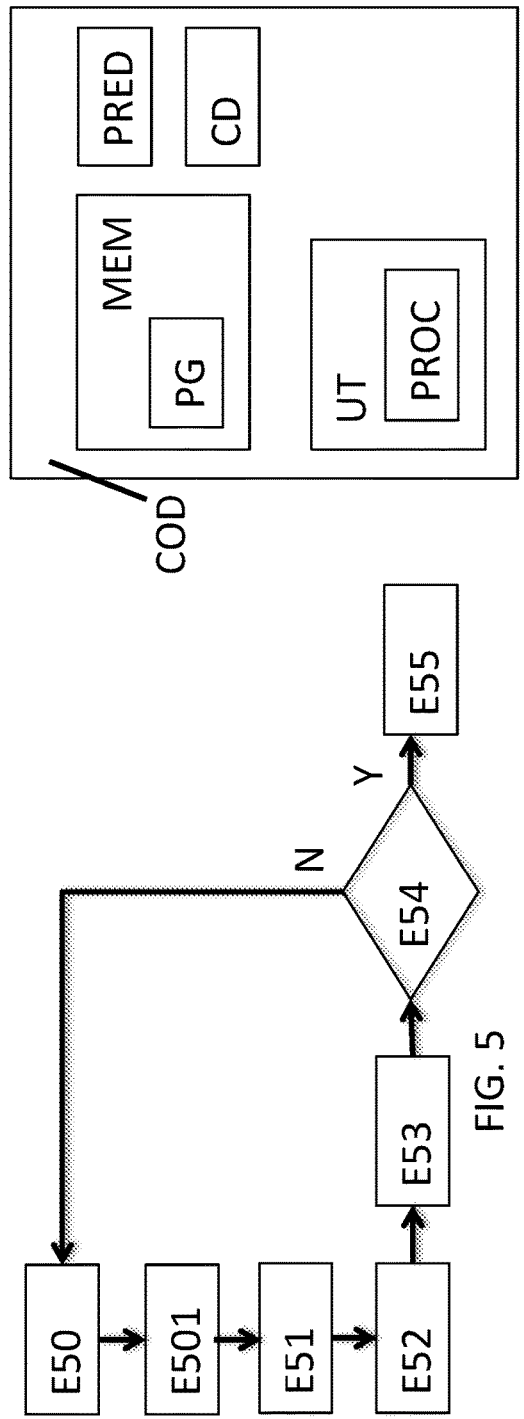
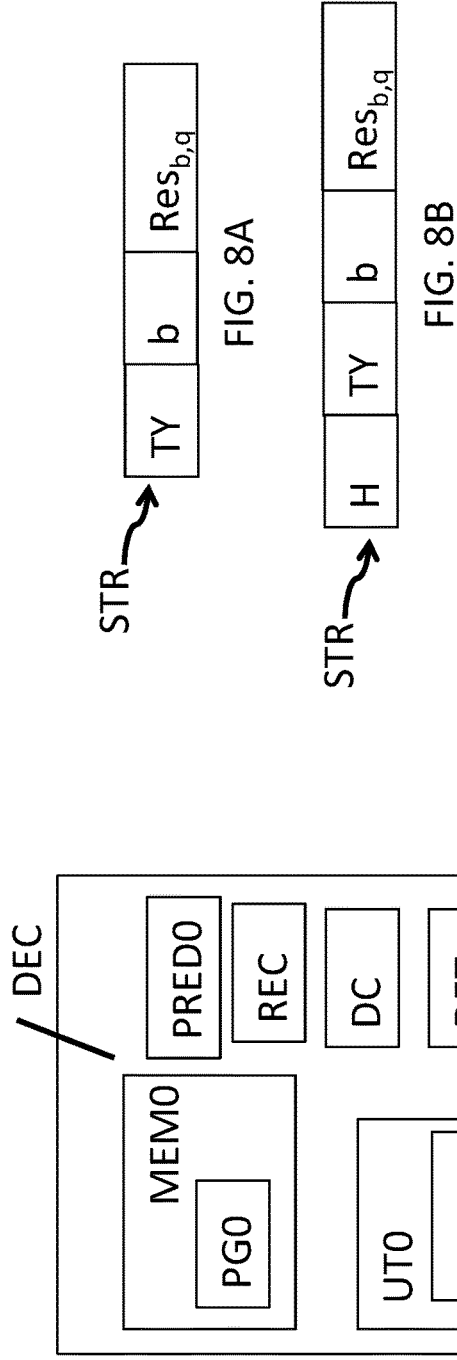

METHODS AND DEVICES FOR CODING AND DECODING A DATA STREAM REPRESENTATIVE OF AT LEAST ONE IMAGE

1. CROSS-REFERENCE TO RELATED APPLICATIONS

This Application is continuation of U.S. application Ser. No. 16/617,275, filed Nov. 26, 2019, which is a Section 371 National Stage Application of International Application No. PCT/FR2018/051210, filed May 18, 2018, and published as WO 2018/220311 A1 on Dec. 6, 2018, not in English, the entire contents of which are hereby incorporated reference.

2. FIELD OF THE INVENTION

The field of the invention is that of the encoding and decoding of images or image sequences, especially video streams.

More specifically, the invention relates to the compression of images or sequences of images using a blockwise representation of the images.

The invention can be applied especially to image or video encoding implemented present-day or future encoders (under the JPEG, MPEG, H.264, HEVC and other standards, and their amendments), and to the corresponding decoding.

3. PRIOR ART

Digital images and image sequences occupy a great deal of memory space. This makes it necessary to compress these images when they are transmitted in order to avoid problems of congestion in the network used for this transmission. Indeed, the bit rate that can be used on this network is generally limited.

There are numerous known techniques of video data compression. These include the HEVC ("High Efficiency Video Coding, Coding Tools and Specification", Matthias Wien, Signals and Communication Technology, 2015) compression standard which proposes to implement a prediction of pixels of a current image relative to other pixels belonging to the same image (intra prediction) or belonging to a preceding or following image (inter prediction).

More specifically, intra prediction exploits spatial redundancies within an image. To this end, the images are sub-divided into blocks of pixels. The blocks of pixels are then predicted by means of already rebuilt information corresponding to previously encoded/decoded blocks in the current image according to the order of scanning of the blocks in the image.

Besides, classically, the encoding of a current block is carried out by means of a prediction of the current block, called a predictive block, and of a prediction residue or "residual block" corresponding to a difference between the current block and the predictive block. The residual block obtained is then transformed, for example by using a DCT (discrete cosine transform) type transform. The coefficients of the transformed residual block are then quantified, then encoded by entropic encoding and transmitted to the decoder which can rebuild the current block by adding this residual block to the predictive block.

The decoding is done image by image and, for each image, it is done block by block. For each block, the corresponding elements of the stream are read. The inverse quantification and inverse transformation of the coefficients of the residual block are performed. Then, the prediction of the block is computed to obtain the predictive block, and the current block is rebuilt by adding the prediction (i.e. the predictive block) to the decoded residual block.

Classically, the intra prediction of a current block is done by using reference pixels of previously rebuilt blocks in the image. Such a situation is illustrated in FIG. 1, in which the reference pixels used to predict the pixels $(X(i,j)_{i=0,1,2,3 \ and \ j=0,1,2,3})$ of a current block X correspond generally to the pixels situated on the line just above the current block (pixels identified by $T(-1, i)_{i=-1,0,1,2,3}$) and the pixels situated on the column to the left of the current block (pixels identified by $T(i, -1)_{i=-1,0,1,2,3}$).

For example, the HEVC standard defines 35 intra prediction modes using such reference pixels, these prediction modes differing from one another by the way in which these reference pixels are used to build a predictive block for the current block.

It can be seen that according to such an intra prediction technique, the pixels situated on the first row and the first column of the predictive block are very well predicted because they are immediately adjacent to the reference pixels. Indeed, the closer the pixels are to each other in space, the greater the extent to which the information that they contain is correlated.

By contrast, the pixels of the predictive block, which are situated at the bottom right-hand side, i.e. far from the reference pixels, for example the pixel X(3,3) illustrated in FIG. 1, are not accurately predicted. Such pixels then provide a prediction residue with high energy and therefore a higher bit rate is needed to encode them.

There is therefore a need for a novel technique for building predictive blocks to predict a current block, improving the compression of the image or video data.

4. SUMMARY OF THE INVENTION

The invention improves on the prior art. It relates to a method for decoding an encoded data stream representative of at least one image sub-divided into blocks. The decoding method comprises the following steps, for at least one current block of the image:

decoding, from the encoded data stream, at least one piece of information representative of a block, called a correction block, and a residual block, determining the correction block from the decoded information, determining a predictive block from the current block comprising:

for at least one first pixel of the current block:
obtaining a prediction value of said first pixel from at least one pixel of a previously rebuilt block of the image,
correcting said first pixel by adding, to the prediction value obtained for the first pixel, at least one value of a pixel of the correction block, for at least one current pixel of the current block, distinct from the first pixel:
obtaining a prediction value of said current pixel from at least one previously corrected pixel of the current block,
correcting said current pixel by adding, to said prediction value obtained for the current pixel, at least one value of a pixel of said correction block, rebuilding said current block on the basis of the predictive block and of the decoded residual block.

Correlatively, the invention relates to a method for encoding at least one image in the form of an encoded data stream, said image being sub-divided into blocks and comprising the following steps for at least one current block of the image to be encoded:

determining a predictive block of the current block comprising:

for at least one first pixel of the current block:

obtaining a prediction value of said first pixel on the basis of at least one pixel of a previously rebuilt block of the image, correcting said first pixel by adding, to the prediction value obtained for said first pixel, at least one value of a pixel of a block, called a correction block, for at least one current pixel of the current block, distinct from the first pixel:

obtaining a prediction value of said current pixel from at least one previously corrected pixel of the current block, correcting said current pixel by adding, to the prediction value obtained for the current pixel, at least one value of a pixel of said correction block, encoding, in the data stream, of at least one piece of information representative of said correction block, computing a residual block from said current block and said determined predictive block, encoding said residual block in the data stream.

According to the invention, the prediction of a current pixel of a current block is thus improved. Indeed, it is thus possible to predict a current pixel of the current block by a pixel of the current block that has previously been corrected. In particular, for a current pixel that is spatially distant from the reference pixels of the current block, i.e. the reference pixels corresponding to the pixels situated just above the current block and to the left of the current block, it is thus possible to predict such a current pixel by pixels of the current block that are closer to this current pixel. Since the prediction of the pixels is improved, the prediction residue between the current block and the predictive block is smaller and the coding cost of the current block is reduced.

According to the invention, an encoding residue for the current block is transmitted in the data stream and added to the predictive block to rebuild the current block, thus improving compression performance.

According to another particular embodiment of the invention, the correction block comprises predetermined residual data.

According to another particular embodiment of the invention, the correction block belongs to a set of predetermined data blocks, said at least one piece of information representative of said correction block enabling the identification of said correction block from among the blocks of the set. According to this particular embodiment of the invention, a dictionary of residue data blocks is available to the encoder and the decoder. For a current block to be encoded or decoded, the correction block is selected from the blocks of the dictionary. For example, the block of the dictionary providing the best bitrate/distortion trade-off to encode the current block is selected as a correction block for the current block.

According to another particular embodiment of the invention, the prediction value of the current pixel is obtained from at least one previously corrected pixel of the current block as a function of a local prediction function applied to the pixel situated above the current pixel, the pixel situated to the left of the current pixel and the pixel situated at the top left of the current pixel. According to this particular embodiment of the invention, a current pixel is predicted through a causal and local neighborhood of this pixel. The correlation between the current pixel and the reference pixels used to predict the current pixel is thus higher than it is with classic intra prediction methods.

According to another particular embodiment of the invention, a piece of information representative of the local prediction function is encoded in or decoded from the encoded data stream. According to this particular embodiment, different local prediction functions can be used to predict the pixels of a current block. It is thus possible to select and signal, to the decoder, the most efficient local prediction function for predicting the pixels of a current block.

According to another particular embodiment of the invention, the encoded data stream comprises, for the current block, a piece of information indicating whether the current block is encoded according to a prediction mode using only pixels belonging to previously rebuilt blocks of the image or whether the current block is encoded according to a prediction mode using at least one previously corrected pixel of the current block. According to this particular embodiment, the data stream comprises a piece of information indicating whether the current block is encoded for example according to a directional intra prediction mode as is known in existing compression standards or according to the new intra prediction mode of any one of the particular embodiments mentioned here above. Thus, it is possible, for each block of the image, to choose the best intra prediction mode in terms of bitrate/distortion.

The invention also relates to a signal comprising encoded data representative of at least one image, sub-divided into blocks. Such a signal comprises, for at least one current block of the image, at least one piece of information representative of a block called a correction block, at least one first pixel of the current block being encoded from at least one value of a pixel of the correction block and a prediction value obtained for said first pixel from at least one pixel of a previously rebuilt block of the image, and at least one current pixel of the current block being encoded from at least one value of a pixel of the correction block and from a prediction value obtained for said current pixel from at least one previously corrected pixel of the current block, delivering a predictive block for the current block. The signal also comprises at least one piece of information representative of a residual block computed from the current block and of the predictive block.

According to one particular embodiment of the invention, the signal furthermore comprises, for the current block, a piece of information indicating whether the current block is encoded according to a prediction mode using only pixels belonging to previously rebuilt blocks of the image or whether the current block is encoded according to a prediction mode using at least one previously corrected pixel of the current block.

The invention also relates to a decoding device configured to implement the decoding method according to any one of the particular embodiments defined here above. This decoding device could of course comprise the different characteristics relative to the decoding method according to the invention. Thus, the characteristics and advantages of this decoding device are the same as those of the decoding method and are not described in more ample details.

According to one particular embodiment of the invention, such a decoding device is comprised in a terminal.

The invention also relates to an encoding device configured to implement the encoding method according to any one of the particular embodiments defined here above. This encoding device could of course comprise the different characteristics of the encoding method according to the invention. Thus, the characteristics and advantages of this encoding device are the same as those of the encoding method, and are not described in more ample details.

According to one particular embodiment of the invention, such an encoding device is comprised in a terminal, or a server.

The decoding method and the encoding method respectively, according to the invention, can be implemented in a variety of ways, especially in wired or software form.
According to one particular embodiment of the invention, the decoding method and the encoding method respectively are implemented by a computer program. The invention also relates to a computer program comprising instructions to implement the method of decoding or the method of encoding according to any one of the particular embodiments described here above when said program is executed by a processor. Such a program can use any programming language whatsoever. It can be downloaded from a communications network and/or recorded on a computer-readable medium or carrier.
This program can use any programming language whatsoever and can be in the form of source code, object code or intermediate code between source code and object code such as in a partially compiled form or in any other desirable form whatsoever.
The invention is also aimed at providing an information carrier or medium readable by a computer, and comprising instructions of a program as mentioned here above. The information carriers mentioned here above can be any entity or device whatsoever capable of storing the program. For example, the carrier or medium can comprise a storage means such as a ROM, for example, a CD ROM or microelectronic circuit ROM or again a magnetic recording means, for example a floppy disk or a hard disk drive. Besides, the information medium can correspond to a transmissible medium such as an electrical or optical signal, that can be conveyed by an electrical or optical cable, by radio or by other means. The program according to the invention can be especially downloaded from an Internet type network.

As an alternative, the recording supports can correspond to an integrated circuit into which the program is incorporated, the circuit being adapted to executing or to being used in the execution of the method in question.

5. LIST OF FIGURES

Figure 3:
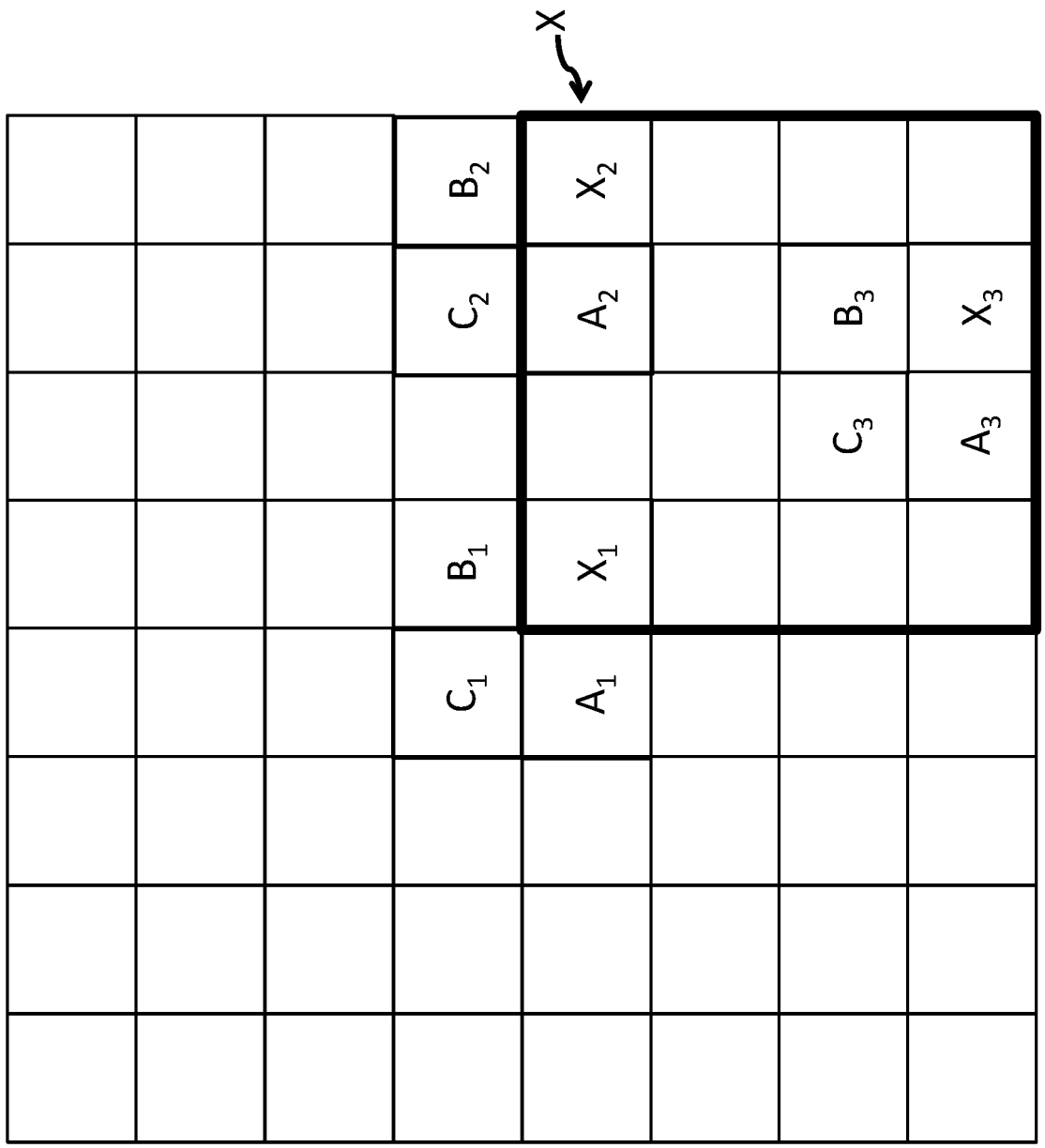
Figure 2:
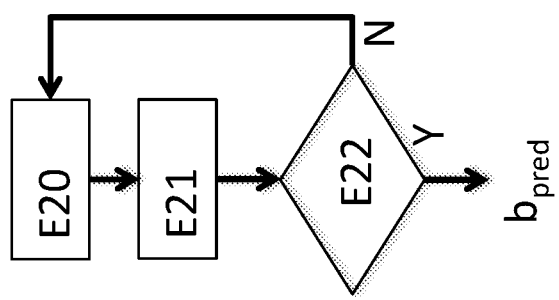
Figure 4:
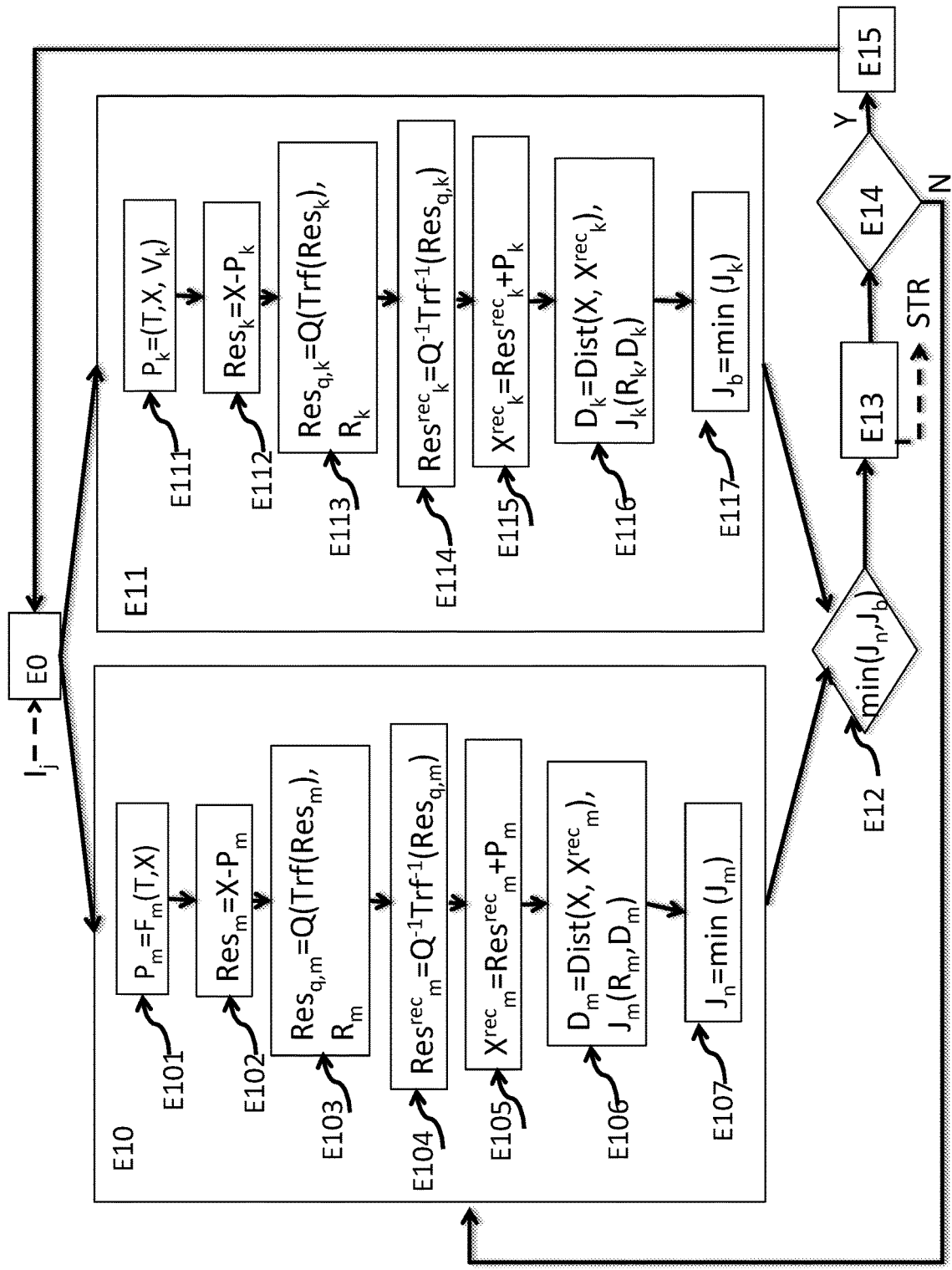

Other features and advantages of the invention shall appear more clearly from the following description of several particular embodiments, given by way of simple illustratory and non-exhaustive examples and from the appended drawings, of which:

FIG. 1 illustrates the position of the reference pixels according to the prior art to predict the pixels of a current block, FIG. 2 illustrates a method for determining a predictive block according to one particular embodiment of the invention, FIG. 3 illustrates examples of position of the reference pixels used to predict pixels of a current block according to one particular embodiment of the invention, FIG. 4 presents steps of the encoding method according to one particular embodiment of the invention, FIG. 5 presents steps of the decoding method according to one particular embodiment of the invention, FIG. 6 presents the simplified structure of an encoding device adapted to implement the encoding method according to any one of the particular embodiments of the invention, FIG. 7 presents the simplified structure of the decoding device adapted to implement the decoding method according to any one of the particular embodiments of the invention, FIG. 8A illustrates an example of a signal comprising encoded data representative at least one block of an image according to one particular embodiment of the invention, FIG. 8B illustrates an example of a signal comprising encoded data representative at least one block of an image according to another embodiment of the invention.

6. DESCRIPTION OF ONE EMBODIMENT OF THE INVENTION

6.1 General Principle

The general principle of the invention is aimed at improving the prediction of the pixels of a block to be encoded of an image, situated far from the reference pixels classically used for the prediction of a block.

To this end, a prediction of these pixels is implemented by the use of pixels of the current block itself which have been previously corrected by means of a residual data block. Such a residual data block is different from an encoding residual block known from the classic methods of encoding by prediction. According to the invention, the residue data block, also called a correction block, comprises residue data used to correct the value of the pixels of the current block which serve to predict the following pixels of the current block. Indeed, the pixels of the current block, which serve to predict the following pixels of the current block, have themselves been predicted by previously corrected pixels of the current block and/or pixels of a previously rebuilt block of the image, but for which the prediction residue has not yet been computed or encoded/decoded. According to the invention, pixels of the current block are predicted by other pixels also belonging to the current block that have not yet been rebuilt, i.e. by means of an encoded/decoded prediction residue but which have been corrected by means of a correction block available to the encoder and to the decoder.

The term "value of a pixel" is understood here to mean the value of a component of the image to be encoded for the pixel. For example, in the case of a representation of the image to be encoded, in the form of a luminance component Y, and with two chrominance components U and V, the method of prediction can be applied to each component, or only to one of them. The invention is obviously not limited to the YUV representation and can be applied similarly to other representations of the image (RGB, YCbCr, etc.).

We present first modes of implementation of the determining of a predictive block for a current block according to the invention, and then a method for encoding a sequence of images and a method for decoding a data stream, both using such a determining of a predictive block for predicting a current block of the image, according to one particular embodiment of the invention, as well as corresponding encoding and decoding devices.

6.2 Determining a Predictive Block for Predicting a Current Block According to One Particular Embodiment of the Invention FIG. 2 illustrates the determining of a predictive block $b_{pred}$ serving to predict a current block X of an image to be encoded.

For each pixel $X_i$ of the current block X, illustrated in FIG. 3 by means of thick lines, a prediction value of the pixel $X_i$ is determined during a step E20. To this end, a local prediction function $H(A_i, B_i, C_i,)$ is used. Such a function $H(A_i, B_i, C_i,)$ computes a prediction value $P_i$ of a pixel $X_i$ from the value of the pixels $A_i$, $B_i$, $C_i$. According to the particular embodiment of the invention described herein, the pixels $A_i$, $B_i$, $C_i$ correspond respectively to the pixel situated to the left of the pixel $X_i$, to the top of pixel $X_i$ and to the top left of the pixel $X_i$.

The local prediction function $H(A_i, B_i, C_i,)$ for example has the form:

$$P_i = H(A_i, B_i, C_i) = \begin{cases} \min(A_i, B_i) \text{ if } C_i > \max(A_i, B_i) \\ \max(A_i, B_i) \text{ if } C_i < \min(A_i, B_i) \\ A_i + B_i - C_i \text{ else} \end{cases}$$

As a variant, other types of local prediction functions can be used, for example $$H(A_i, B_i, C_i) = \frac{A_i + B_i + C_i}{3}.$$

The local prediction function $H(A_i, B_i, C_i,)$ can be known to the encoder and to the decoder, or else transmitted in the encoded data stream, at the encoded data of an image or the sequence of images.

Depending on the position of the pixel $X_i$ in the current block X, the local prediction function uses pixels $A_i$, $B_i$, $C_i$ that can belong to previously rebuilt blocks of the image and/or belonging to the current block X For example, for the pixel $X_1$ of FIG. 3, the prediction value is determined from the pixels $A_1$, $B_1$ and $C_1$, i.e. solely by means of reference pixels belonging to previously rebuilt blocks of the image, and more specifically to the blocks situated above, to the left and to the top-left of the current block.

For the pixel $X_2$ of FIG. 3, the prediction value is determined from the pixels $A_2$, $B_2$ and $C_2$, i.e. by means of reference pixels belonging to a previously rebuilt blocks of the image and by means of pixels belonging to the current block.

For the pixel $X_3$ of FIG. 3, the prediction value is determined from the pixels $A_3$, $B_3$ and $C_3$, i.e. solely by means of pixels belonging to the current block.

In general, and with notations referring to FIG. 1, for a pixel X(lin, col) of the current block X, where lin represents the index of the row of the pixel X relative to the upper left-hand corner of the block X and col represents the index of the column of the pixel X relative to the upper left-hand corner of the block X, the prediction value G(lin, col) is obtained by:

$G(lin, col) = H(T(0, -1), T(-1, 0), T(-1, -1))$ if $lin = 0$ and $col = 0$, $G(lin, col) = H(T(lin, -1), P_k(lin - 1, 0), T(lin - 1, -1))$, if $lin > 0$ and $col = 0$, $G(lin, col) = H(P_k(0, col - 1), T(-1, col), T(-1, col - 1))$, if $lin = 0$ and $col > 0$, $G(lin, col) = H(P_k(lin, col - 1)$, $P_k(lin - 1, col), P_k(lin - 1, col - 1)$, if $lin > 0$ and $col > 0$ with T(lin, col) a pixel belonging to a previously rebuilt block, H is the local prediction function and $P_k(x,y)$ is the prediction value of a pixel X(x,y) that belongs to the current block X and has been previously corrected by a correction block $V_k$ described here below.

At the end of the step E20, a prediction value G(lin, col) is obtained for the current pixel X(lin, col).

During a step E21, the prediction value G(lin, col) is corrected by means of a value of a correction block $V_k$ for the pixel X(lin, col). The correction block $V_k$ is a residual data block comprising for example values between −255 and +255 when the values of pixels represented on 8 bits.

According to one particular embodiment of the invention, the correction block $V_k$ belongs to a set or dictionary of predetermined residual data blocks $\{V_k\}_{k=0...N}$, N being the number of blocks of the set.

For example, such a dictionary comprises a subset of all the possible combinations of values of residues, the subset being selected for example by learning from a group of images and/or being transmitted with the encoded data stream.

For example, it is considered in this example that the pixels of the image are encoded on 8 bits and each pixel of a correction block can negatively or positively correct a prediction value which is itself represented on 8 bits. Such a pixel of a correction block must then have a dynamic range of 9 bits. Hence, for a correction block sized 8×8 pixels for example, the number of possible blocks is $2^{9\times64}$. It would then be necessary to encode a large amount of information to identify the correction block chosen from among all the possible combinations of values of residues. In addition, the search for the best correction block would be very costly in terms of computation.

In practice, dictionary sizes comprising for example 32 to 512 correction blocks allow to obtain an optimal compression, i.e. a high gain in quality for reduced information transmission. It is however necessary to choose the blocks of the dictionary well so that such correction blocks are representative of the blocks truly useful for making a correction of the pixels of the current block.

According to the example described here, the dictionary $\{V_k\}_{k=0...N}$ is built as a subset of correction blocks among a vast set of correction blocks comprising all the possible correction blocks, i.e. comprising all the combinations of values of residues possible. According to a first variant, to build this dictionary $\{V_k\}_{k=0...N}$, a classic building technique that uses the Linde-Buzo-Gray algorithm (i.e. the LBG algorithm) is used as described in Linde, Y.; Buzo, A.; Gray, R. (1980). *"An Algorithm for Vector Quantizer Design"*. IEEE Transactions on Communications. 28: 84. doi:10.1109/TCOM.1980.1094577. This technique uses a sequence for learning pixel blocks to be corrected, and an initial dictionary, for example chosen at random. This technique then iterates two steps:

a first step which, for each block of the learning sequence, determines the best correction block of the dictionary as understood in terms of a predetermined criterion, for example the distortion generated by the use of the correction block during the prediction of the pixels of the current block of the learning sequence. The learning blocks are divided into classes, each class being the set of learning blocks associated with a correction block of the dictionary.

for each class, a new correction block is determined so that this block improves the predetermined criterion for said class. The dictionary block associated with the class is then replaced by this new block.

Other methods known to those skilled in the art for building a quantification dictionary are possible, such as for example the "Pairwise Nearest Neighbor" approach described in "*Vector Quantization and Signal Compression*" by Allen Gersho and Robert M. Gray, *The Springer International Series in Engineering and Computer Science Series Volume* 159 Springer US.

Preferably, the correction block $V_k$ has a size identical to that of the current block.

In one particular embodiment of the invention, a same correction block is used for all the pixels of the current block.

During the step E21, the value of the correction block $V_k(\text{lin, col})$ is added to the prediction value $G(\text{lin, col})$ obtained for the pixel $X(\text{lin, col})$, to obtain the corrected prediction value $P_k(\text{lin, col})$ of the pixel $X(\text{lin, col})$: $P_k(\text{lin, col})=G(\text{lin, col})+V_k(\text{lin, col})$.

During a step E22, it is checked if all the pixels of the current block have been predicted. If this is the case (Y in FIG. 2), a predictive block $b_{pred}$ associated with the correction block $V_k$ comprising, for each pixel $X(\text{lin, col})$, a corrected prediction value $P_k(\text{lin, col})$ is available to encode or rebuild the current block. Else (N in FIG. 2), the operation passes to the prediction of the next pixel of the current block by iterating the steps E20 and E21 for the next pixel.

6.3 Encoding Method

FIG. 4 presents the steps of the method for encoding a sequence of images $I_1, I_2, \ldots, I_{Nb}$ to be encoded in the form of an encoded data stream STR according to one particular embodiment of the invention. For example, such an encoding method is implemented by an encoding device as described with reference to FIG. 6.

An image sequence $I_1, I_2, \ldots, I_{Nb}$, Nb being the number of images of the sequence to be encoded, is provided at input to the encoding method. The encoding method outputs an encoded data stream STR representative of the image sequence given at input.

In a known way, the encoding of the image sequence $I_1, I_2, \ldots, I_{Nb}$ is done image by image according to an encoding order that is preset and known to the decoder. For example, the images can be encoded in the temporal order $I_1, I_2, \ldots, I_{Nb}$ or according to any other order, for example $I_1, I_3, I_2, \ldots, I_{Nb}$.

In a step E0, an image $I_j$ to be encoded of the image sequence $I_1, I_2, \ldots, I_{Nb}$ is sub-divided into blocks, for example blocks sized 32×32 or 64×64 pixels or more. Such a block can be sub-divided into square or rectangular sub-blocks, for example sized 16×16, 8×8, 4×4, 16×8, 8×16, etc.

Then, during the step E0, a block or sub-block X to be encoded of an image $I_j(1 \leq j \leq Nb)$ is selected according to a predetermined direction of scanning of the image $I_j$.

It is assumed here that the block X is encoded according to an intra encoding mode. Among the intra encoding modes available, it is assumed that the block X can be encoded by means of a classic intra encoding mode, for example according to an intra encoding mode defined in the HEVC standard described in "*Overview of the High Efficiency Video Coding (HEVC) Standard*", G.-J. Sullivan, J.-R. Ohm, W.-J. Han, T. Wiegand, *IEEE Transactions on Circuits and Systems for Video Technology*, December 2012, or else by means of intra encoding using a prediction as described here above with reference to FIGS. 2 and 3. The encoding method described here applies of course to other modes of intra prediction available for encoding the current block X and is not limited solely to the intra encoding modes described in the HEVC standard.

According to the particular embodiment described here, the best intra encoding mode for the block X will be selected by means of bitrate/distortion costs associated with each intra encoding mode.

During a step E10, the best classic intra mode for encoding the block X is determined. The classic intra prediction consists in predicting the set of pixels $X(\text{lin,col})$ of the current block by previously rebuilt pixels $T(\text{lin,col})$, where lin represents the index in the image of the row of the pixels relative to the upper left-hand corner of the block X and col represents the index in the image of the column of the pixels relative to the upper left-hand corner of the block X as illustrated in FIG. 1. The previously rebuilt pixels $T(\text{lin,col})$ are interpolated by an interpolation function chosen from a set of functions $\{F_m\}$ where the value of m ranges from 0 to M-1, M being the number of intra modes for each pixel $X(\text{lin,col})$, the predicted value $P(\text{lin,col})$ is given by $P(\text{lin,col})=F_m(T,\text{lin,col})$, where m is the index of the intra prediction mode.

Thus, according to the HEVC standard, the mode M=1 consists in assigning each predicted pixel $P(\text{lin,col})$ the mean value of the previously rebuilt pixels $T(\text{lin,col})$. The modes indexed m>1 are directional interpolations in 33 different directions from the pixels $T(\text{lin,col})$ previously rebuilt.

During the step E10, the best possible prediction among the classic intra prediction modes m, m=0,M-1 is determined.

To this end, for each prediction mode m ranging from 0 to M-1:

- during a sub-step E101, the predictive block $P_m$ is built by applying the corresponding prediction function to each pixel of the current block X: $P_m(\text{lin,col})=F_m(T, \text{lin, col})$,
- during a sub-step E102, the prediction residue $\text{Res}_m$ of the current block X for the mode m is computed for each pixel of the current block X, by $\text{Res}_m(\text{lin, col})=X(\text{lin, col})-P_m(\text{lin,col})$,
- classically, during a sub-step E103, the prediction residue is transformed, for example by a DCT transform, and quantified, delivering quantified coefficients $\text{Res}^q_m$, and an encoding cost $R_m$ associated with the intra prediction mode m is estimated from the quantified coefficients $\text{Res}^q_m$ and from the cost for signaling the intra prediction mode m,
- during a sub-step E104, the prediction residue $\text{Res}^{rec}_m$ is rebuilt by inverse quantification and inverse transform of the quantified coefficients $\text{Res}^q_m$,
- during a sub-step E105, the current block $X^{rec}_m$ is rebuilt by $X^{rec}_m=\text{Res}^{rec}_m+P_m$,
- during a sub-step E106, the distortion $D_m$ between the current block X and the rebuilt current block $X^{rec}_m$ associated with the prediction mode intra m is computed: $D_m=\text{Dist}(X, X^{rec}_m)$, with Dist representing an error function, for example a quadratic error function, and the bitrate/distortion cost associated with the intra prediction mode m is computed: $J_m=R_m+\lambda \times D_m$.

During a sub-step E107, the prediction module n giving the lowest bit rate/distortion cost $J_n$ among all the bit rate/distortion costs $J_m$ associated with the prediction mode m from 0 to M-1 is selected as the best classic intra prediction mode. The prediction mode n, the pieces of encoded information associated with the residue $\text{Res}^q_n$ and the rebuilt current block $X^{rec}_m$ are stored for the subsequent part of the operation.

During a step E11, the cost of encoding an intra prediction mode as described with reference to FIGS. 2 and 3 is determined in order to be subsequently compared with the best classic intra prediction mode. For greater clarity, the intra prediction mode as described with reference to FIGS. 2 and 3 will be called a "mode with corrected prediction".

During the step E11, the correction block $V_b$ providing an encoding of the current block X for which the bit rate/distortion cost according to the corrected prediction mode is the lowest is determined. To this end, for each correction block $V_k$ of the set of correction blocks k ranging from 0 to N-1, the following sub-steps are implemented:

during a sub-step E111, the predictive block $P_k$ associated with the correction block $V_k$ is built by implementing the steps 20 to 22 described with reference to FIG. 2, during a sub-step E112, the prediction residue $Res_k$ of the current block X for the correction block $V_k$ is computed for each pixel of the current block X, by $Res_k(lin, col)=X(lin, col)-P_k(lin,col)$.

during a sub-step E113, the prediction residue is transformed, for example by a DCT transform, and quantified delivering quantified coefficients $Res^q_k$, and the encoding cost $R_k$ associated with the correction block $V_k$ is estimated from the quantified coefficients and from the cost of signaling the correction block $V_k$. For example, the correction block $V_k$ is signaled to the decoder by the encoding of the index of the correction block $V_k$ among the set of correction blocks, during a sub-step E114, the prediction residue $Res^{rec}_k$ is rebuilt by inverse quantification and inverse transform of the quantified coefficients $Res^q_k$, during a sub-step E115, the current block $X^{rec}$ is rebuilt by $X^{rec}_k=Res^{rec}_k+P_k$, during a sub-step E116, the distortion $D_k$ between the current block X and the rebuilt current block $X^{rec}_k$ associated with the correction block $V_k$ is computed: $D_k=Dist(X,X^{rec}_k)$, with Dist an error function, for example a quadratic error function, and the bit rate/distortion cost associated with the correction block $V_k$ is computed: $J_k=R_k+\lambda \times D_k$.

During a sub-step E117, the correction block $V_b$ providing the lowest bit rate/distortion cost $J_k$ associated with the correction block $V_k$, with k being a value ranging from 0 to N-1, is selected as the best correction block. The index of the correction block $V_b$ and the encoded information associated with the prediction residue $Res_b$ are stored for the subsequent part of the operation.

During a step E12, the bit rate/distortion costs $J_n$ and $J_b$ of the two prediction modes respectively obtained during the step E10 and during the step E11 are compared and the current block X is encoded according to the intra prediction mode providing the lowest bit rate/distortion cost.

During the step E12, a piece of information (TY) indicating the type of intra prediction mode is encoded in the data stream STR as illustrated in FIGS. 8A and 8B. Such a piece of information indicates whether the current block X is encoded according to a classic intra prediction mode, i.e. a prediction mode using only pixels belonging to previously rebuilt blocks of the image, or whether the current block X is encoded according to a mode with corrected prediction, i.e. a prediction mode using at least one previously corrected pixel of the current block X.

If it is determined during the step E12 that the best intra prediction mode to encode the current block X is the classic intra prediction mode n, then during a step E13, the prediction mode n is encoded in the encoded data stream STR and the quantified coefficients $Res^q_n$ obtained for this prediction mode n are encoded in the encoded data stream STR by an entropic encoding module, for example a CABAC encoder described in D. Marpe, H. Schwarz, T. Wiegand, "Context-based adaptive binary arithmetic coding in the H.264/AVC video compression standard" IEEE Transactions on Circuits and Systems for Video Technology (Volume:13, Issue: 7), pages 620-636, July 2003.

If it is determined during the step E12 that the best intra prediction mode to encode the current block X is the mode with corrected prediction using the correction block $V_b$, then during the step E13, a piece of information representative of the correction block $V_b$ is encoded in the encoded data stream STR, for example the index "b" of the correction block $V_b$ in the dictionary of correction blocks. Such an index is for example encoded by a code with fixed or variable length. The quantified coefficients $Res^q_b$ obtained during the step E113 for the correction block $V_b$ are then encoded in the encoded data stream STR by an entropic encoding module, for example a CABAC encoder. One example of a signal resulting from the encoding of the current block X according to the mode with corrected prediction is illustrated in FIG. 8A.

According to one particular embodiment of the invention, a piece of information representative of the local prediction function $H(A_i, B_i, C_i)$ used for the mode with corrected prediction is encoded in the encoded data stream STR as illustrated in FIG. 8B. According to this particular embodiment of the invention, such a piece of information can be encoded at the image level. Thus, the same local prediction function is used for all the blocks of the image when they are encoded according to the mode with corrected prediction. Or else, such a piece of information can be encoded at the block level, and thus the local prediction function can be adapted to each block, and the local prediction function providing the best bit rate/distortion cost can be selected.

At a step E14, it is verified that all the blocks of the image to be encoded $I_j$ have been encoded. If not (N), the encoding method returns to the step E10 by proceeding to the selection of the next block according to a predetermined scan of the image to be encoded.

If all the blocks of the image have been processed, then at a step E15, an image $I_j^{rec}$ is rebuilt from the rebuilt blocks $X^{rec}$ of the image and saved in a list of reference images to be used subsequently as a reference during the encoding of the following images of the sequence of images. The encoding method then returns to the step E0 to process the following images of the sequence of images according to the encoding order.

6.4 Decoding Method

FIG. 5 presents steps of a method for decoding a stream STR of encoded data representing a sequence of images $I_1$, $I_2, \ldots, I_{Nb}$ to be decoded according to one particular embodiment of the invention.

For example, the data stream STR has been generated through the encoding method presented with reference to FIG. 4. The data stream STR is provided at input of a decoding device DEC as described with reference to FIG. 7.

The decoding method carries out the decoding of the stream image by image and each image is decoded block by block.

For a block X of an image to be rebuilt, during the step E50, the data of the data stream STR corresponding to the block X are decoded by an entropic decoding module to provide on the one hand syntax elements relating to the encoding mode for the current block X and on the other hand coefficients of prediction residues $\text{Res}^q{}_b$ of the current block X.

According to one particular embodiment of the invention, the decoded syntax elements comprise notably a piece of information (TY) indicating whether the current block X is encoded according to a classic intra prediction mode, i.e. a prediction mode using only pixels belonging to previously rebuilt blocks of the image, or whether the current block X is encoded according to a corrected prediction mode, i.e. a prediction mode using at least one previously corrected pixel of the current block X.

It is assumed here that the current block X is encoded according to a mode with corrected prediction.

The syntax elements decoded during the step E50 also comprise a piece of information "b" representative of a correction block $V_b$ belonging to a dictionary of correction blocks available at the decoder DEC.

At a step E501, the correction block $V_b$ is determined from the decoded information "b". The correction block $V_b$ is identified among the correction blocks of the dictionary available at the decoder DEC. For example, such correction blocks are stored in a memory of the decoder DEC.

At a step E51, the coefficients of prediction residues of the block X undergo an inverse quantification, and then an inverse transform to give a decoded prediction residue $\text{Res}^q{}_b{}^{rec}$.

At a step E52, a predictive block $P_b$ associated with the correction block $V_b$ is built by implementing the steps 20 to 22 described with reference to FIG. 2.

According to one particular embodiment of the invention, the decoded syntax elements decoded during the step E50 also comprise a piece of information representative of a local prediction function $H(A_i, B_i, C_i,)$ used for the mode with corrected prediction. Such a piece of information can be decoded at the level of the image syntax elements or for the current block X. Such a piece of information representative of a local prediction function $H(A_i, B_i, C_i,)$ can be an index of a function from among a list of prediction functions known to the encoder and the decoder. According to this particular embodiment of the invention, the decoded local prediction function $H(A_i, B_i, C_i,)$ of the encoded data stream STR is used by the method for determining a predictive block described with reference to FIG. 2 during the step E52.

During a step E53, the current block $X^{rec}$ is rebuilt by adding, to a predictive block $P_b$ associated with the correction block $V_b$, the prediction residue $\text{Res}^q{}_b{}^{rec}$ associated with the current block X which has been decoded from the encoded data stream STR.

At a step E54, it is verified that all the blocks of the image to be decoded have been decoded and rebuilt. If not (N), the decoding method resumes at the step E50 in carrying out the selection of the next block according to a predetermined scanning of the image to be decoded.

If all the blocks of the image have been processed (Y), then at a step E55, an image $I_k{}^{rec}$ is rebuilt from the rebuilt blocks $X^{rec}$ and saved in a list of reference images to be used subsequently as references during the decoding of the following images in the image sequence.

The encoding and decoding methods described here above can be integrated into standard video encoders/decoders such as devices using the H.266, HEVC/H.265, AVC/H.264 standards or any type of proprietary video encoder/decoder. The encoding and decoding methods according to the invention apply also to all types of fixed image encoders/decoders and more generally signal encoders/decoders using a blockwise predictive encoding.

The encoding and decoding methods have been described here above in the case of spatial blockwise encoding (intra encoding of an image). These methods easily apply in the case of images encoded according to other types of encoding modes, for example inter encoding modes, in which only certain blocks can be encoded by spatial prediction.

6.5 Encoding Device

FIG. 6 represents the simplified structure of an encoding device COD adapted for implementing the encoding method according to any one of the particular embodiments of the invention.

According to one particular embodiment of the invention, the steps of the encoding method are implemented by computer program instructions. To this end, the encoding device COD has the classic architecture of a computer and comprises especially a memory MEM, a processing unit UT, equipped for example with a processor PROC and managed by the computer program PG stored in the memory MEM. The computer program PG comprises instructions to implement the steps of the encoding method as described here above when the program is executed by the processor PROC.

At initialization, the computer program code instructions PG are for example loaded into a memory RAM and then executed by the processor PROC. The processor PROC of the processing unit UT implements notably the steps of the encoding method described here above according to the instructions of the computer program PG.

According to another particular embodiment of the invention, the encoding method is implemented by functional modules. To this end, the encoding device COD furthermore comprises:

a prediction module PRED configured to determine a predictive block for a current block of an image to be encoded, the prediction module PRED being also configured for the following:
  for at least one first pixel of the current block:
    obtaining a prediction value of said first pixel from at least one pixel of a previously rebuilt block of the image,
    correcting the first pixel by adding at least one value of a pixel of a block, called a correction block, to the prediction value obtained for said first pixel,
  for at least one pixel of the current block:
    obtaining a prediction value of said current block from at least one previously corrected pixel of the current block,
    correcting said current pixel by adding at least one value of a pixel of said current block to the prediction value obtained for the current pixel,
an encoding module CD adapted to the encoding, in the encoded data stream, of at least one piece of information representative of said correction block and a residual block computed from said current block and said determined predictive block.

The processing unit UT is configured to compute the residual block from the current block and from the determined predictive block.

The processing unit UT cooperates with the different functional modules described here above and the memory MEM in order to implement the steps of the encoding method.

The different functional modules described here above can be in hardware form and/or software form. In hardware form, such a functional module can include a processor, a memory, and a program code instructions to implement the function corresponding to the module when the code instructions are executed by the processor. In hardware form, such a functional module can be implemented by any type of adapted encoding circuit such as for example and non-exhaustively, microprocessors, digital signal processors (DSPs), applications specific integrated circuits (ASICs), field programmable gate arrays (FPGA) circuits, a wiring of logic units, etc.

6.6 Decoding Device

FIG. 7 represents the simplified structure of an decoding device DEC adapted for implementing the decoding method according to any one of the particular embodiments of the invention.

According to one particular embodiment of the invention, the decoding device DEC has the classic architecture of a computer and comprises notably a memory MEM0, a processing unit UT0, equipped for example with a processor PROC0 and managed by the computer program PG0 stored in memory MEM0. The computer program PG0 comprises instructions to implement the steps of the decoding method as described here above when the program is executed by the processor PROC0.

At initialization, the computer program code instructions PG0 are for example loaded into a memory RAM and then executed by the processor PROC0. The processor PROC0 of the processing unit UT0 implements notably the steps of the decoding method described here above according to the instructions of the computer program PG0.

According to another particular embodiment of the invention, the decoding method is implemented by functional modules. To this end, the decoding device DEC further comprises:
  decoding module DC configured, for at least one current block of an image to be rebuilt, to decode at least one piece of information representative of a block, called a correction block, and a residual block from the encoded data stream.
  a module for determining DET configured to determine the correction block from the decoded piece of information,
  a prediction module PRED0 configured to determine a predictive block of the current block, the prediction module PRED0 being configured:
    for at least one first pixel of the current block:
      to obtain a prediction value of said first pixel from at least one pixel of a previously rebuilt block of the image,
      correct the first pixel by adding, to the prediction value obtained for said first pixel, at least one value of a pixel of the correction block,
    for at least one current pixel of the current block, distinct from the first pixel,
      obtaining a prediction value of said current pixel from at least one previously corrected pixel of the current block,
      correcting said current pixel by adding, to the prediction value obtained for the current pixel, at least one value of a pixel of the correction block,
  a rebuilding module REC adapted to rebuilding said current block from the predictive block and the residual block.

The processing unit UT0 cooperates with the different functional modules described here above and the memory MEM0 in order to implement the steps of the decoding method.

The different functional modules described here above can be in hardware and/or software form. In software form, such a functional module can include a processor, a memory and program code instructions to implement the function corresponding to the module when the code instructions are executed by the processor. In hardware form, such a module can be implemented by any type of adapted decoding circuits such as for example, non-exhaustively, microprocessors, digital signal processors, applications specific integrated circuits (ASICs), Field Programmable Gate Arrays (FPGAs), a wiring of logic units.

What is claimed is:

1. A method comprising:
  decoding an encoded data stream representative of at least one image, said image being sub-divided into blocks, the decoding comprising the following acts performed by a decoding device for at least one block of the image, called a current block:
  decoding, from the encoded data stream:
    at least one piece of information representative of a correction block, the correction block comprising correction values, and
    a residual block, which is different from the correction block and comprises residual data,
  determining the correction block from the decoded piece of information representative of the correction block,
  determining at least from the correction block a predictive block for predicting the current block, comprising:
    for at least one current pixel of the current block:
      obtaining a prediction value of said current pixel from at least one prediction value of another pixel of the current block,
      correcting said prediction value obtained for the current pixel by adding, to said prediction value obtained for the current pixel, at least one correction value of a pixel of the correction block,
  rebuilding said current block from athe predictive block and the decoded residual data of said residual block,
  wherein the prediction value of said current pixel is obtained by applying a local prediction function to said at least one prediction value of another pixel of the current block, said local prediction function being used for all the blocks of said image on which said decoding act is performed.

2. The method according to claim 1, wherein the correction block comprises predetermined values of pixels.

3. The method according to claim 1, wherein the prediction value of the current pixel is obtained as a function of the local prediction function applied to the pixel situated above the current pixel, to the pixel situated to the left of the current pixel and to the pixel situated at the top left of the current pixel.

4. The method according to claim 3, wherein a piece of information representative of the local prediction function is decoded from the encoded data stream.

5. The method according to claim 1, wherein said at least one prediction value of another pixel of the current block is a value of a pixel preceding the current pixel in the current block.

6. The method according to claim 1, wherein the encoded data stream comprises, for the current block, a piece of information indicating whether the current block is encoded according to a prediction mode using only pixels belonging to previously rebuilt blocks of the image or whether the current block is encoded according to a prediction mode using at least one previously corrected pixel of the current block.

7. The method according to claim 1, wherein said at least one piece of information representative of a correction block is the size of the correction block.

8. The method according to claim 1, wherein the current block is square or rectangular.

9. The method according to claim 1, wherein the correction block has a size identical to that of the current block.

10. The method according to claim 1, wherein, in said act of determining a predictive block, the obtaining of a prediction value and the correction of said prediction value are performed for each pixel of the current block.

11. A method comprising:
encoding at least one image in the form of an encoded data stream, said image being sub-divided into blocks, the encoding comprising the following acts performed by an encoding device for at least one block of the image to be encoded, called a current block:
determining a predictive block for predicting the current block, the act of determining comprising:
for at least one current pixel of the current block:
obtaining a prediction value for said current pixel from at least one prediction value of another pixel of the current block,
correcting said prediction value obtained for the current pixel by adding, to said prediction value obtained for the current pixel, at least one correction value of a pixel of a correction block, said correction block comprising correction values,
encoding, in the data stream, at least one piece of information representative of said correction block,
computing residual data of a residual block from said current block and said determined predictive block,
encoding the residual data of said residual block in the data stream,
wherein the prediction value of said current pixel is obtained by applying a local prediction function to said at least one prediction value of another pixel of the current block, said local prediction function being used for all the blocks of said image on which said decoding act is performed.

12. The method according to claim 11, wherein the correction block comprises predetermined values of pixels.

13. The method according to claim 11, wherein the prediction value of the current pixel is obtained as a function of the local prediction function applied to the pixel situated above the current pixel, to the pixel situated to the left of the current pixel and to the pixel situated at the top left of the current pixel.

14. The method according to claim 13, wherein a piece of information representative of the local prediction function is decoded from the encoded data stream.

15. The method according to claim 11, wherein said at least one prediction value of another pixel of the current block is a value of a pixel preceding the current pixel in the current block.

16. The method according to claim 11, wherein the encoded data stream comprises, for the current block, a piece of information indicating whether the current block is encoded according to a prediction mode using only pixels belonging to previously rebuilt blocks of the image or whether the current block is encoded according to a prediction mode using at least one previously corrected pixel of the current block.

17. The method according to claim 11, wherein said at least one piece of information representative of a correction block is the size of the correction block.

18. A decoding device comprising:
a processor; and
a non-transitory computer-readable medium comprising instructions stored thereon, which when executed by the processor configure the decoding device to decode an encoded data stream representative of at least one image, said image being sub-divided into blocks, the decoding comprising, for at least one block of the image, called a current block:
decoding, from the encoded data stream:
at least one piece of information representative of a correction block, the correction block comprising correction values, and
a residual block, which is different from the correction block and comprises residual data,
determining the correction block from the decoded piece of information representative of the correction block,
determining at least from the correction block a predictive block for predicting the current block, comprising:
for at least one current pixel of the current block:
obtaining a prediction value of said current pixel from at least one prediction value of another pixel of the current block,
correcting said prediction value obtained for the current pixel by adding, to said prediction value obtained for the current pixel, at least one correction value of a pixel of the correction block,
rebuilding said current block from athe predictive block and the decoded residual data of said residual block,
wherein the prediction value of said current pixel is obtained by applying a local prediction function to said at least one prediction value of another pixel of the current block, said local prediction function being used for all the blocks of said image on which said decoding act is performed.

19. An encoding device comprising:
a processor; and
a non-transitory computer-readable medium comprising instructions stored thereon, which when executed by the processor configure the encoding device to encode at least one image in the form of an encoded data stream, said image being sub-divided into blocks, the encoding comprising, for at least one block of the image to be encoded, called a current block:
determining a predictive block for predicting the current block, the act of determining comprising:
for at least one current pixel of the current block:
obtaining a prediction value for said current pixel from at least one prediction value of another pixel of the current block,
correcting said prediction value obtained for the current pixel by adding, to said prediction value obtained for the current pixel, at least one correction value of a pixel of a correction block, said correction block comprising correction values,
encoding, in the data stream, at least one piece of information representative of said correction block,
computing residual data of a residual block from said current block and said determined predictive block,
encoding the residual data of said residual block in the data stream,
wherein the prediction value of said current pixel is obtained by applying a local prediction function to said at least one prediction value of another pixel of the current block, said local prediction function being used for all the blocks of said image on which said decoding act is performed.

20. A non-transitory computer-readable medium comprising a computer program stored thereon comprising instructions for implementing a method of decoding an encoded data stream representative of at least one image, when the program is executed by a processor of a decoding device, said image being sub-divided into blocks, wherein the instructions configure the decoding device to perform the following acts for at least one block of the image, called a current block:

decoding, from the encoded data stream:
        at least one piece of information representative of a correction block, the correction block comprising correction values, and
        a residual block, which is different from the correction block and comprises residual data,
    determining the correction block from the decoded piece of information representative of the correction block,
    determining at least from the correction block a predictive block for predicting the current block, comprising:
    for at least one current pixel of the current block:
        obtaining a prediction value of said current pixel from at least one prediction value of another pixel of the current block,
        correcting said prediction value obtained for the current pixel by adding, to said prediction value obtained for the current pixel, at least one correction value of a pixel of the correction block,
    rebuilding said current block from a-the predictive block and the decoded residual data of said residual block,
    wherein the prediction value of said current pixel is obtained by applying a local prediction function to said at least one prediction value of another pixel of the current block, said local prediction function being used for all the blocks of said image on which said decoding act is performed.

21. A non-transitory computer-readable medium comprising a computer program stored thereon comprising instructions for implementing a method of encoding at least one image in the form of an encoded data stream, when the program is executed by a processor of an encoding device, said image being sub-divided into blocks, wherein the instructions configure the encoding device to perform the following acts for at least one block of the image to be encoded, called a current block:

determining a predictive block for predicting the current block, the act of determining comprising:
    for at least one current pixel of the current block:
        obtaining a prediction value for said current pixel from at least one prediction value of another pixel of the current block,
        correcting said prediction value obtained for the current pixel by adding, to said prediction value obtained for the current pixel, at least one correction value of a pixel of a correction block, said correction block comprising correction values,
    encoding, in the data stream, at least one piece of information representative of said correction block,
    computing residual data of a residual block from said current block and said determined predictive block,
    encoding the residual data of said residual block in the data stream
    wherein the prediction value of said current pixel is obtained by applying a local prediction function to said at least one prediction value of another pixel of the current block, said local prediction function being used for all the blocks of said image on which said decoding act is performed.

\* \* \* \* \*